United States Patent [19]

Murata et al.

[11] 4,122,132

[45] Oct. 24, 1978

[54] DISPERSION STABILIZER

[75] Inventors: Yoshifumi Murata; Yoshio Ohfuji, both of Kurashiki, Japan

[73] Assignee: Kuraray Co., Ltd., Kurashiki, Japan

[21] Appl. No.: 700,167

[22] Filed: Jun. 28, 1976

[30] Foreign Application Priority Data

Jul. 8, 1975 [JP] Japan .................................. 50-83852

[51] Int. Cl.$^2$ ...................... C08L 67/06; C08G 63/02
[52] U.S. Cl. .................................. 260/873; 260/876 R; 260/887; 260/890; 260/892
[58] Field of Search ............... 260/873, 876 R, 876 B, 260/78.3 UA, 78.3 R

[56] References Cited

U.S. PATENT DOCUMENTS

| | | |
|---|---|---|
| 3,842,146 | 10/1974 | Milkovich et al. .................. 260/879 |
| 3,862,077 | 1/1975 | Schulz et al. ................. 260/876 R X |
| 3,879,494 | 4/1975 | Milkovich et al. ............... 260/876 R |
| 3,928,255 | 12/1975 | Milkovich et al. .......... 260/876 R X |
| 3,989,768 | 11/1976 | Milkovich et al. ............... 260/859 R |

*Primary Examiner*—Thomas De Benedictis, Sr.
*Attorney, Agent, or Firm*—Bacon & Thomas

[57] ABSTRACT

A comb-like copolymer comprising an alkenyl aromatic polymer by way of trunk and a saturated polyester by way of branch is incorporated in an unsaturated polyester resin to which an alkenyl aromatic polymer is added for reducing the cure shrinkage of the resin so as to impart dispersion stability to said alkenyl aromatic polymer.

6 Claims, No Drawings

DISPERSION STABILIZER

The present invention relates to a dispersion stabilizer for an unsaturated polyester resin containing an alkenyl aromatic polymer.

Unsaturated polyester resin, which is a mixture of an unsaturated polyester and one or more copolymerizable monomers, is currently used in large quantities because of its low prices, superior physical properties of the shaped articles obtainable therefrom and other characteristics. However, the resin has been found to have several drawbacks, e.g. it displays such a high rate of shrinkage on cure that the moldings tend to be strained, cracked or lacking in surface flatness and smoothness. To solve the problems, it has been proposed, as set forth in Netherlands Pat. No. 6814862, to disperse and mix a thermoplastic polymer such as polystyrene into an unsaturated polyester resin so as to eliminate the shrinkage that would otherwise be caused by cure.

When such method is employed, however, the dispersion stability of the thermoplastic polymer in the unsaturated polyester resin is so low that several problems are inevitable. For example, the thermoplastic resin separates out in the course of molding and, consequently, sticks to the mold or dies or the shaped article will have a rough surface or a tacky surface. In resin concrete applications, the thermoplastic resin tends to exude out onto the surface so that the cured concrete structure will present a tacky surface. This tendency is particularly pronounced when a molding method involving a centrifugal load, e.g. centrifugal casting method, is employed.

To overcome the above disadvantage, it has been suggested to stabilize the dispersion of the thermoplastic polymer through the addition of a graft polymer consisting of an alkenyl aromatic polymer, such as polystyrene, and polyethylene glycol as grafted to one or both terminals of said alkenyl aromatic polymer to an unsaturated polyester resin containing a thermoplastic polymer (French Pat. No. 2,216,317). This additive is effective to some extent when the unsaturated polyester has a high degree of unsaturation, that is to say, when the proportion of unsaturated dicarboxylic acid in the dicarboxylic acid component of the unsaturated polyester is high, but its effect is less pronounced as the degree of unsaturation of the unsaturated polyester is low.

It is, therefore, an object of the present invention to provide a dispersion stabilizer which is free from the aforementioned disadvantages of the prior art and which has a highly desirable effect upon any and all unsaturated polyester resins containing alkenyl aromatic polymers.

In accordance with the present invention, there is provided a dispersion stabilizer comprising a comb-like polymer which consists of an alkenyl aromatic polymer by way of trunk and a saturated polyester by way of branch. When this stabilizer is incorporated in a low-shrinkage resin composition comprising (a) an unsaturated polyester, (b) one or more monomers copolymerizable with (a) and (c) an alkenyl aromatic polymer, the dispersion stability of said resin composition is markedly improved.

The dispersion stabilizer according to the present invention, i.e. the comb-like copolymer consisting of an alkenyl aromatic polymer by way of trunk and a saturated polyester by way of branch, can be produced for example by the following procedures.

(1) A process which comprises copolymerizing a saturated polyester having an unsaturated double bond at one of its terminal ends with an alkenyl aromatic monomer;
(2) A process which comprises reacting a copolymer of maleic anhydride and an alkenyl aromatic monomer with a saturated polyester having a hydroxyl group at one of its terminal ends;
(3) A process which comprises reacting a copolymer of a vinyl monomer having an epoxy group and an alkenyl aromatic monomer with a saturated polyester having a carboxyl group at one of its terminal ends.

It should be understood that many other known processes may be employed for the production of a comb-like copolymer employable according to the present invention.

The saturated polyester which is the branch-component of the comb-like copolymer used as the dispersion stabilizer according to the present invention can be produced by reacting a saturated dicarboxylic acid or an anhydride thereof with a glycol.

As examples of the saturated dicarboxylic acid or anhydride thereof, there may be mentioned phthalic acid, isophthalic acid, terephthalic acid, endomethylenetetrahydrophthalic acid, tetrahydrophthalic acid, tetrachlorophthalic acid, tetrabromophthalic acid, hexachloroendomethylenetetrahydrophthalic acid, hexahydrophthalic acid, succinic acid, adipic acid, trimellitic acid, sebacic acid, etc. and their anhydrides. It is desirable that succinic acid or its an hydride account for at least 10 mole percent of such saturated carboxylic acid or anhydride thereof, for the resultant comb-like copolymer will then have particularly excellent dispersion-stabilizing activity.

As examples of said glycol, there may be mentioned ethylene glycol, propylene glycol, 1,3-butanediol, dipropylene glycol, diethylene glycol, triethylene glycol, neopentyl glycol, 1,4-butanediol, 1,6-hexanediol and so forth.

The resultant saturated polyester is desirably only very sparingly soluble in a solution of said alkenyl aromatic polymer in said copolymerizable monomer and desirably has a good compatibility with the unsaturated polyester resin to be employed. Generally, by varying the proportion of succinic acid in saturated polyester, there may be obtained a saturated polyester satisfying such conditions. Thus, as the degree of unsaturation of the unsaturated polyester in a unsaturated polyester resin composition is increased, the succinic acid content of the saturated polyester may be increased so as to obtain a saturated polyester well compatible with the unsaturated polyester resin. The average molecular weight of saturated polyester is 500 or more and, preferably, in the range of 1000 to 10,000.

The alkenyl aromatic polymer constituting the trunk-moiety of said comb-like copolymer can be synthesized by polymerizing a monomer containing at least 50 mole percent of an alkenyl aromatic monomer such as styrene, vinyltoluene, α-methylstyrene, t-butylstyrene, chlorostyrene or the like. The preferred alkenyl aromatic monomer is styrene, and the proportion of styrene is desirably as high as possible. The other monomers which may be contained in amounts not exceeding a total of 50 mole percent may for example be conjugated diene monomers, e.g. butadiene, isoprene, etc.; acrylic acid, methacrylic acid and their esters; vinyl esters, e.g. vinyl acetate; acrylonitrile; maleic anhydride and other copolymerizable vinyl monomers such as vinyl monomers containing an epoxy group which are employed in the production of comb-like copolymers; and so forth.

The dispersion-stabilizing effect of the comb-like copolymer is particularly pronounced when the polymeric formulation of said (C) component alkenyl aromatic polymer which is added to the unsaturated polyester resin for the purpose of reducing the shrinkage of the resin is the same as the polymeric formulation constituting the trunk-moiety of the comb-like copolymer. Thus, in the production of the comb-like copolymer, the polymer composition for its trunk structure is desirably predetermined in consideration of the above relationship. The weight ratio of the trunk-constituting polymer to the branch-forming polymer as a whole is desirably in the range of 0.25 to 2 times. The distance between any two adjacent branches of the trunk polymer chain preferably is substantially equal to the average length of the individual polymer branches, a comb-like copolymer having such a structure displaying a particularly excellent dispersion-stabilizing effect. The distance between branches of the trunk polymer can be freely varied by changing the proportions of the saturated polyester containing an unsaturated double bond at one terminal end and the alkenyl aromatic monomer when the first-mentioned process 1) is employed. Thus, this ratio is usually the copolymerization ratio. The molecular weight of the trunk polymer is preferably not less than about 1000.

It is also important to ensure that no gelation will take place during the production of the comb-like copolymer. There are many ways to prevent gelation. Where said first process (1) is employed, for instance, gelation may be precluded for example by fairly reducing the number of maleic anhydride groups relative to the number of terminal hydroxyl groups in the reaction between the saturated polyester and maleic anhydride for the introduction of a double bond into the terminal hydroxyl of said saturated polyester.

The present dispersion-stabilizer comprising a comb-like copolymer consisting of an alkenyl aromatic polymer by way of trunk and saturated polyester segments as branches, when it is added as aforesaid to a low-shrinkage unsaturated polyester resin composition containing (a) an unsaturated polyester, (b) at least one monomer copolymerizable with (a), and (c) an alkenyl aromatic polymer, enhances the dispersion-stability of the alkenyl aromatic polymer in the resin composition. The effective level of addition of said comb-like copolymer is between 0.005 to 1.0 times the weight of (c) alkenyl aromatic polymer, the preferred range being 0.02 to 0.5 times the weight of (c).

It is often the case that the comb-like copolymer includes certain amounts of the branch polymer residue or/and of the unbranched truck polymer but their presence does not adversely affect the desired effect.

The unsaturated polyester forming one of the components of the resin composition to which the comb-like copolymer dispersion-stabilizer of the present invention is added can be produced from materials known per se by processes known per se.

Thus, as examples of the unsaturated dibasic acid component, there may be mentioned maleic anhydride, fumaric acid, itaconic acid and so forth. As the polyhydric alcohol component, there may be mentioned propylene glycol, ethylene glycol, diethylene glycol, dipropylene glycol, butanediol, glycerin, pentaerythritol, triethylene glycol, pentanediol, hexanediol, neopentyl glycol, hydrogenated bisphenol A, bisphenol A-alkylene oxide adducts, propylene oxide, ethylene oxide and so forth. Of course, part of the unsaturated dibasic acid may be replaced by saturated polybasic acids such as phthalic acid, isophthalic acid, terephthalic acid, endomethylenetetrahydrophthalic acid, tetrahydrophthalic acid, tetrachlorophthalic acid, tetrabromophthalic acid, hexachloroendomethylenetetrahydrophthalic acid, hexahydrophthalic acid, succinic acid, adipic acid, trimellitic acid and their anhydrides. However, it is necessary that the unsaturated polyester to which the dispersion stabilizer of the present invention is added be substantially insoluble in a copolymerizable monomer solution in which the alkenyl aromatic polymer has been dissolved.

As examples of the monomers copolymerizable with said unsaturated polyester, there may be mentioned alkenyl aromatic monomers such as styrene, α-methylstyrene, t-butylstyrene, etc.; acrylic acid methacrylic acid and their alkyl esters; vinyl acetate and so forth, although styrene is particularly desirable. The ratio of such copolymerizable monomer to unsaturated polyester is within the range of 0.7 to 5 times, preferably 1 to 3 times by weight.

The alkenyl aromatic polymer which is added to the unsaturated polyester resin, i.e. a mixture of said unsaturated polyester and said copolymerizable monomer for the purpose of imparting a low shrinkage is the polymer obtainable by polymerizing a monomer containing not less than 50 mole percent of an alkenyl aromatic monomer such as styrene, α-methylstyrene, t-butylstyrene, chlorostyrene or the like. The monomers which may be contained in amounts not in excess of a total of 50 mole percent include, among others, conjugated diene monomers such as butadiene, isoprene, etc.; acrylic acid, methacrylic acid and their alkyl esters; vinyl esters such as vinyl acetate; acrylonitrile; and so forth. As typical examples of such polymer, there may be mentioned polystyrene, polyvinyltoluene, high-impact polystyrene, styrene-butadiene-styrene block copolymer, styrene-butadiene rubber, styrene-acrylonitrile copolymer, styrene-methyl methacrylate copolymer, ABS resin and so forth. The ratio of such alkenyl aromatic polymer to unsaturated polyester resin is normally in the range of 0.005 to 0.3 times by weight. Such alkenyl aromatic polymers must be substantially insoluble in a solution of unsaturated polyester in a copolymerizable monomer, i.e. substantially insoluble in the unsaturated polyester resin, and, instead, be present as merely dispersed in the solution.

In the unsaturated polyester resin composition containing the comb-like copolymer dispersion stabilizer according to the present invention may be incorporated a polymerization catalyst such as an organic peroxide, e.g. benzoyl peroxide, methyl ethyl ketone peroxide, cumene hydroperoxide, cyclohexanone peroxide, lauroyl peroxide or the like, or a radical-generating nitrile such as azobisisobutyronitrile and, if necessary, further with a polymerization promotor such as cobalt naphthenate, cobalt octenate, organometallic compounds, aliphatic amines, aromatic amines, mercaptans, etc. and the resultant systems may be caused to cure in a manner known per se. During the cure reaction, there is quite a low or no reduction in volume and, in certain cases, an expansion takes place.

The low-shrinkage unsaturated polyester resin composition based on an alkenyl aromatic polymer, which contains, as added, the comb-like copolymer as the dispersion-stabilizer in accordance with the present invention, may not only be used as it is with advantage in various applications but may be used in combination with fillers, e.g. calcium carbonate, silica powder, barium sulfate, calcium sulfate, etc., pigments and reinforcing agents such as glass fiber, asbestos, organic fibers, etc. as sheet molding compounds, bulk molding compounds, preform matched-die molding materials and so forth. The said composition may also be compounded with inorganic fillers and aggregates such as river sand, ballast, crushed stone, etc. to make resin concrete or resin mortar which is a substitute for cement concrete. As compound with an aggregate or mica flake, it may be used as a lining material for the inner wall of a pipe, e.g. a metal or concrete pipe. The lined pipe thus obtained has excellent resistance to acid and salt. The present composition may also be used as an adhesive or a crack maintenance agent.

Thus, the addition of a small proportion of the comb-like copolymer dispersion stabilizer according to the present invention to an unsaturated polyester resin composition containing an alkenyl aromatic polymer results in a significant increase in the dispersion stability of the alkenyl aromatic polymer in the unsaturated polyester resin composition, thus enabling one to obtain a resin system which has a long shelf life and withstands molding under a high gravitational force. Moreover, the system on cure yields a shaped article without a shrinkage and having an attractive surface.

The following examples are further illustrative of the present invention. In these examples, unless otherwise specified, all parts and percents are by weight. Further, in the examples, the molecular weights of the saturated polyesters forming the branch moieties of the corresponding product comb-like copolymer were determined by the vapor pressure method, while the molecular weights of the trunk polymers were determined by hydrolyzing each sample with KOH-benzyl alcohol, treating the same with HCl to isolate the trunk polymer and subjecting it to gel permeation chromatography.

EXAMPLE 1

In the first place, the following unsaturated polyester resins were prepared. [A] In 35 parts of styrene monomer was dissolved 65 parts of the unsaturated polyester synthesized by esterifying a mixture of 2.0 moles of maleic anhydride, 4.0 moles of phthalic anhydride, 5.4 moles of propylene glycol and 0.9 mole of diethylene glycol, followed by the addition of 0.011 part of hydroquinone. The resin will hereinafter be referred to briefly as UP-1. [B] In 35 parts of styrene monomer was dissolved 65 parts of the unsaturated polyester synthesized by esterifying a mixture of 2.1 moles of fumaric acid, 0.63 mole of phthalic anhydride, 1.37 moles of ethylene glycol, 0.79 mole of propylene glycol and 0.78 mole of 1,4-butanediol, followed by the addition of 0.011 part of hydroquinone. This resin will hereinafter be called UP-2.

The following dispersion stabilizers were produced. [a] A mixture of 1.0 mole of phthalic anhydride, 1.0 mole of succinic anhydride and 2.1 moles of ethylene glycol was reacted at 150° C for 2 hours, after which time the temperature was increased to 200° c, whereby a saturated polyester having a hydroxyl value of 17 was obtained. This saturated polyester was reacted with 6.2 g. of maleic anhydride at 160° C. Then, 100 parts of the saturated polyester was dissolved in 50 parts of dibutyl phthalate and, following addition of 33 parts of styrene monomer and 2 parts of benzoyl peroxide, the polymerization reaction was carried out at 80° C for 4 hours. The resultant comb-like copolymer will hereinafter be called STA-1.

The saturated polyester constituting the branches of this comb-like copolymer had an average molecular weight of 1,500, the trunk polymer thereof having an average molecular weight of 40,000. The copolymerization ratio of styrene monomer to maleic acid of the trunk polymer was 1 : 0.028. [b] A mixture of 1.0 mole of phthalic anhydride, 2.0 moles of succinic anhydride and 3.15 moles of ethylene glycol was reacted in the same manner as [a] to obtain a saturated polyester having a hydroxyl value of 19.9. Following the addition of 11.4 g. of maleic anhydride, the subsequent procedure set forth in [a] above was repeated to obtain a comb-like copolymer which will hereinafter be called STA-2. The average molecular weight of the saturated polyester constituting the branches of the comb-like copolymer was 1,300 and that of the trunk polymer was 40,000. The copolymerization ratio of styrene monomer to maleic acid of the trunk polymer was 1 : 0.028. [c] As in [a], a saturated polyester prepared from 1.0 mole of phthalic anhydride, 1.0 mole of succinic anhydride and 2.1 moles of ethylene glycol was reacted with maleic anhydride. Thereafter, the reaction procedure of [a] was repeated except that a mixture of 30 parts of styrene monomer and 3 parts of methyl methacrylate was used in lieu of 33 parts of styrene monomer. The product comb-like copolymer will hereinafter be called STA-3. The saturated polyester constituting the branches of this comb-like copolymer had an average molecular weight of 1,500, the trunk polymer of said copolymer having an average molecular weight of 40,000.

Each of the copolymers obtained by the above procedures [a] and [c], i.e. STA-1 or STA-3, in amounts of 0.06, 0.12 and 0.24 parts, respectively, were stirred into 20 parts of a solution of 30 parts of polystyrene in 70 parts of styrene monomer. To this mixture was added 80 parts of UP-1, the unsaturated polyester resin prepared in [A]. The mixture was stirred with a glass rod for 5 minutes and, then, allowed to stand at room temperature. The time which elapsed before the emergence of a clear layer one-third as thick as the body of emulsion due to phase separation was measured. The results are set forth in Tables 1 and 2. The indicated levels of addition of STA-1 and STA-3 are the amounts calculated to the exclusion of dibutyl phthalate, the solvent used for the synthesis of the copolymers.

Table 1

| Level of STA-1 | Time before phase separation |
|---|---|
| 0.00 | 15 min. |
| 0.06 | 12 days |
| 0.12 | 30 days |
| 0.24 | 60 days |

Table 2

| Level of STA-3 | Time before phase separation |
|---|---|
| 0.00 | 20 min. |
| 0.06 | 9 days |
| 0.12 | 14 days |
| 0.24 | 25 days |

When a saturated polyester, instead of STA-3, was added in comparable amounts, the time before separation was invariably 20 minutes, irrespective of the levels of addition.

The dispersion stability was investigated for STA-2, the copolymer obtained in [b], by the same test procedure as above, except that UP-2 was used in lieu of UP-1. The results are set forth in Table 3.

Table 3

| Level of STA-2 | Time before phase separation |
|---|---|
| 0.00 | 20 min. |
| 0.06 | 5 days |
| 0.12 | 18 days |
| 0.24 | 30 days |

EXAMPLE 2

1.5 moles of isophthalic acid, 1.87 moles of ethylene glycol and 0.3 mole of 2,2-di(4-hydroxypropoxyphenyl)propane were taken into a flask of 1-liter capacity and the condensation reaction was carried out at 180° C until the acid value was 3.8. Then, following the addition of 0.5 mole of succinic anyhdride, the condensation was further carried out at 210° C to obtain a saturated polyester having an acid value of 23.

This saturated polyester was cooled to 160° C and, following the addition of 10.3 g. of maleic anhydride, the system was heated at 160° C for 1 hour. Then, 100 parts of dibutyl phthalate was added to 100 parts of the above saturated polyester and, after cooling to 80° C, 33 parts of styrene monomer and 0.6 parts of benzoyl peroxide were added. The polymerization was caused to proceed at 80° until a comb-like copolymer was obtained. The branches of this comb-like copolymer had an average molecular weight of 3,000, the trunk polymer having an average molecular weight of 40,000. The copolymerization ratio of styrene monomer to maleic acid of the trunk polymer was 1 : 0.028.

In 40 parts of styrene monomer was dissolved 60 parts of the unsaturated polyester obtained from 1.0 mole of isophthalic acid, 1.0 mole of maleic anhydride and 2.1 moles of propylene glycol. In 70 parts of the resultant resin solution was dissolved 2.5 parts of the above comb-like copoylmer and, with the addition of 30 weight parts of styrene containing 30 weight % of polystyrene, the system was dispersed by stirring at a high speed.

The resultant emulsion was so stable that, when left standing at room temperature, it showed phase separation only after about a month. In contrast, the time before separation for the control sample free from the comb-like copolymer was as short as 15 minutes.

EXAMPLE 3

1.0 mole of isophthalic acid, 1.54 moles of ethylene glycol and 0.6 mole of 2,2-di(4-hydroxypropoxyphenyl)propane were taken into a flask of 1-liter capacity and the condensation reaction was conducted at 180° C until the acid value was 11.4. Then, following addition of 1.0 mole of succinic anhydride, the system was heated at 160° C for 1 hour. The condensation was further carried out at 210° C to obtain a saturated polyester having an acid value of 24.7. After the polyester was cooled to 160° C, 12 g. of maleic anhydride was added, followed by heating at 160° C for 1 hour. Thereafter, 100 parts of dibutyl phthalate was added to 100 parts of the saturated polyester and, after cooling to 80° C, 33 parts of styrene monomer and 0.6 part of benzoyl peroxide were added. The polymerization reaction was conducted at 80° C to obtain a comb-like copolymer. The average molecular weight of the branches of this comb-like copolymer was 3,000 and that of the trunk polymer was 40,000. The copolymerization ratio of styrene monomer to maleic acid of the trunk polymer was 1 : 0.028.

In 40 parts of styrene monomer was dissolved 60 parts of the unsaturated polyester prepared from 1.0 mole of maleic anhydride and 1.03 moles of 2,2-di(4-hydroxypropoxyphenyl)propane. In 70 parts of the resultant resin solution was dissolved 2.5 parts of the above comb-like copolymer and, with the addition of 30 parts of styrene containing 30 weight % of polystyrene, the mixture was dispersed by stirring at a high speed.

The resultant emulsion was so stable that, when allowed to stand at room temperature, it showed phase separation only after about a month. The time before separation for the control sample free from the comb-like copolymer was as short as 25 minutes.

EXAMPLE 4

2.0 moles of succinic anhydride, 1.0 mole of phthalic anhydride and 3.15 moles of ethylene glycol were taken into a flask of 1-liter capacity and the reaction procedure of Example 2 was repeated to obtain a saturated polyester having an acid value of 24. This polyester was further treated in the same manner as Example 2 to obtain a comb-like copolymer.

In 40 parts of styrene monomer was dissolved 60 parts of the unsaturated polyester prepared from 2.0 moles of adipic acid, 1.0 mole of maleic anhydride, 1.5 moles of propylene glycol and 1.65 moles of diethylene glycol. In 70 parts of the resultant resin solution was dissolved 2.5 parts of the above comb-like copolymer and, with the addition of 30 weight parts of styrene containing 30 weight % of polystyrene, the system was dispersed by stirring at a high speed.

The resultant emulsion was so stable that, when allowed to stand at room temperature, it showed phase separation only after about 3 months. In contrast, the time before phase separation for the control sample free from the comb-like copolymer was as short as 15 minutes.

EXAMPLE 5

In 75 parts of styrene monomer was dissolved 25 parts of high-impact polystyrene (Styron 492 $^{200}$, Asahi-Dow, Ltd.).

On the other hand, in 70 parts of styrene monomer was dissolved 30 parts of styrene-acrylonitrile copolymer (Tyril 783 $^{200}$, Asahi-Dow, Ltd.).

In 20 parts each of the above solutions was dissolved 0.24 part of STA-1, prepared in Example 1, and, after thorough stirring, 80 parts of UP-1 was added. As in Example 1, the time before phase separation was determined. The time for the high-impact polystyrene was 12 days and that for the styrene-acrylonitrile copolymer was 14 days. The time before phase separation for the control samples free from the comb-like copolymer was 25 minutes in both cases.

EXAMPLE 6

There was prepared a SMC composition according to the formula indicated in Table 4.

Table 4

| Ingredient | Amount (in parts) |
|---|---|
| UP-2 | 47.8 |
| Styrene monomer | 7.3 |
| STA-2 | 2.5 |
| Polystyrene styrene solution (containing 30 wt. % polystyrene) | 40 |

Table 4-continued

| Ingredient | Amount (in parts) |
| --- | --- |
| Calcium carbonate | 140 |
| Magnesium oxide | 1.4 |
| Zinc stearate | 1.5 |
| t-Butyl perbenzoate | 1.5 |
| Red pigment | 6 |
| Glass fiber (1" lengths) | 105 |

The above SMC was aged at 50° C for 18 hours, after which it was press-molded at 150 kg/cm² and 150° C for 3 minutes to obtain a shaped article.

The shaped article had a prominent gloss with no color shading. There was no adhesion to the mold at all. The shrinkage of this article was 0.03%.

Control Example 1

A SMC was prepared by the same procedure as Example 6, except that no STA-2 was added. In the course of aging, this SMC came to present a sticky surface owing to an exudation of polystyrene. This SMC was press-molded in the same manner as Example 6 to obtain a shaped article. The article had a whitish clouded surface, with a prominent color shading, its adhesion to the mold being also extensive. The cure shrinkage of the shaped article was 0.15%.

EXAMPLE 7

There was prepared a resin concrete having the composition indicated in Table 5.

Table 5

| Ingredient | Proportions (in part) |
| --- | --- |
| Unsaturated polyester* | 33 |
| Styrene monomer | 60 |
| Polystyrene | 7.5 |
| STA-1 | 2.5 |
| Hydroquinone | 0.007 |
| Calcium carbonate | 170 |
| River sand (grain diam. 5 mm) | 330 |
| Cobalt naphthenate solution (cobalt content 6%) | 0.6 |
| Methyl ethyl ketone peroxide (55% solution) | 1.2 |

Referring to the above table, the unsaturated polyester was synthesized from 2.0 moles of maleic anhydride, 4.0 moles of phthalic anhydride, 5.4 moles of propylene glycol and 0.9 mole of diethylene glycol.

The above resin concrete composition was charged into a mold, 4 cm wide, 16 cm long and 4 cm deep, and fully compacted by vibrating. The concrete was allowed to cure at 20° C for 24 hours. Then, the metal mold was removed and the cured concrete was allowed to stand for 13 days. The product was completely free from cracks, warpage or other defects, with no exudation of polystyrene to the surface. The shrinkage was nil. The bending strength of the cured product was 275 kg/cm².

Control Example 2

The procedure of Example 7 was repeated, except that STA-1 was omitted from the formulation of Table 5, to prepare a resin concrete and a shaped article was produced therefrom. The shaped article presented a tacky surface, with a polystyrene exudate, there also being observed a profusion of air cells and cracks in the surface layer. The rates of shrinkage of the article were 0.15% in the upper layer and 0.05% in the lower layer, the bending strength being 172 kg/cm².

EXAMPLE 8

There was prepared a composition according to the formula shown in Table 6.

Table 6

| Ingredient | Amount (in parts) |
| --- | --- |
| Unsaturated polyester* | 36 |
| Styrene monomer | 58 |
| Polystyrene | 6 |
| STA-1 | 2 |
| Hydroquinone | 0.009 |
| Calcium carbonate | 170 |
| River sand | 330 |
| Cobalt naphthenate (cobalt content 6%) | 0.5 |
| Methyl ethyl ketone peroxide (55% solution) | 1 |

*Referring to the above table, the unsaturated polyester is the same as that used in Example 7.

Referring to the above table, the unsaturated polyester is the same as that used in Example 7.

Six kilograms of the above composition was charged into a cylindrical mold, 150 mm in diameter and 400 mm long, revolving at a centrifugal load of 5 times gravity. The rotational speed was increased to 50 times the gravitational force and the cylinder was kept revolving at room temperature for 30 minutes. After the rotation was stopped, the mold was heated at 80° C for 1 hour and, then, collapsed. The resultant pipe of resin concrete was free from cracks, distortion and other defects, the surface being satisfactory in flatness and smoothness.

Control Example 3

The procedure of Example 8 was repeated except that STA-1 was omitted from the composition to produce a pipe of resin concrete. The outer surface of the pipe showed a profusion of cracks and the inner surface was considerably tacky due to a polystyrene exudate.

The above examples are for illustrative purposes only and it should be understood that a number of changes and modifications may be made by those skilled in the art without departing from the spirit and scope of the invention.

What is claimed is:

1. A dispersion stabilizer for imparting dispersion stability to an alkenyl aromatic polymer in an unsaturated polyester resin to which said alkenyl aromatic polymer is added so as to reduce the shrinkage property of said resin, said dispersion stabilizer comprising a comb-like copolymer having an alkenyl aromatic trunk polymer and saturated polyester branch polymer segments; said trunk and branch polymers being copolymerized by reacting a terminal reactable group on said saturated polyester with a corresponding reactable group from the monomers forming said alkenyl aromatic polymer.

2. A dispersion stabilizer as set forth in claim 1, wherein said saturated polyester is such that at least 10 mole percent of its dicarboxylic acid or anhydride component is a member of the group consisting of succinic acid and succinic anhydride.

3. A dispersion stabilizer as set forth in claim 1 wherein said saturated polyester has an average molecular weight of not less than 500.

4. A dispersion stabilizer as set forth in claim 1, wherein the alkenyl aromatic polymer constituting the trunk of said comb-like copolymer is a polymer obtainable by polymerizing a monomer containing not less than 50 mole percent of an alkenyl aromatic monomer.

5. A dispersion stabilizer as set forth in claim 1, wherein the weight of the alkenyl aromatic polymer constituting the trunk of said comb-like copolymer is 0.25 to 20 times the total weight of the saturated polyester constituting all the branches of the same copolymer.

6. A dispersion stabilizer as set forth in claim 4, wherein said alkenyl aromatic monomer is styrene.

* * * * *